(12) United States Patent
Matick et al.

(10) Patent No.: US 7,958,311 B2
(45) Date of Patent: *Jun. 7, 2011

(54) CACHE LINE REPLACEMENT TECHNIQUES ALLOWING CHOICE OF LFU OR MFU CACHE LINE REPLACEMENT

(75) Inventors: Richard Edward Matick, Cortlandt Manor, NY (US); Jaime H. Moreno, Dobbs Ferry, NY (US); Malcolm Scott Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 12/130,278

(22) Filed: May 30, 2008

(65) Prior Publication Data

US 2009/0031084 A1 Jan. 29, 2009

Related U.S. Application Data

(63) Continuation of application No. 11/523,485, filed on Sep. 19, 2006, now Pat. No. 7,398,357, which is a continuation of application No. 10/719,294, filed on Nov. 21, 2003, now Pat. No. 7,133,971.

(51) Int. Cl.
*G06F 12/12* (2006.01)

(52) U.S. Cl. ......... 711/134; 711/135; 711/136; 711/159
(58) Field of Classification Search .................. None
See application file for complete search history.

(56) References Cited

U.S. PATENT DOCUMENTS

| 5,937,429 | A | 8/1999 | Kumar et al. |
| 6,883,066 | B2 | 4/2005 | Herbst et al. |
| 2002/0194432 | A1 | 12/2002 | Rodriguez |
| 2005/0015555 | A1 | 1/2005 | Wilkerson |

*Primary Examiner* — Hetul Patel
(74) *Attorney, Agent, or Firm* — Ryan, Mason & Lewis, LLP (57) ABSTRACT

Methods and apparatus allowing a choice of Least Frequently Used (LFU) or Most Frequently Used (MFU) cache line replacement are disclosed. The methods and apparatus determine new state information for at least two given cache lines of a number of cache lines in a cache, the new state information based at least in part on prior state information for the at least two given cache lines. Additionally, when an access miss occurs in one of the at least two given lines, the methods and apparatus (1) select either LFU or MFU replacement criteria, and (2) replace one of the at least two given cache lines based on the new state information and the selected replacement criteria. Additionally, a cache for replacing MFU cache lines is disclosed. The cache additionally comprises MFU circuitry (1) adapted to produce new state information for the at least two given cache lines in response to an access to one of the at least two given cache lines, and (2) when a cache miss occurs in one of the at least two given cache lines, adapted to determine, based on the new state information, which of the at least two given cache lines is the most frequently used cache line.

18 Claims, 6 Drawing Sheets

CACHE LINE REPLACEMENT TECHNIQUES ALLOWING CHOICE OF LFU OR MFU CACHE LINE REPLACEMENT

CROSS REFERENCE TO RELATED APPLICATIONS

This application is a continuation of U.S. patent application Ser. No. 11/523,485, filed Sep. 19, 2006, now U.S. Pat. No. 7,398,357 which is a continuation of U.S. patent application Ser. No. 10/719,294, filed on Nov. 21, 2003, now U.S. Pat. No. 7,133,971 each incorporated by reference herein.

FIELD OF THE INVENTION

This invention relates to computer systems, and, more particularly, relates to caches used by processors in computer systems.

BACKGROUND OF THE INVENTION

Caches are used to speed up accesses to recently accessed information During a read from main memory, a copy of the read information will also be stored in the cache. When the processor next accesses the information, the cache will generally supply the information (assuming that the information is still in the cache), instead of having a read performed of main memory to determine the information. This speeds access time to the information, as the memory used in a cache will typically be on the order of ten to hundreds of times faster than the memory used in the main memory of a computer system. With increased speed generally also comes increased cost, area, complexity, and power demands. Consequently, caches are highly optimized to work efficiently in the intended computer environment.

Caches are generally organized into two portions, namely a cache data array and a directory. The cache data array stores information from main memory, while the directory contains items such as the main memory addresses to which the information belongs.

A "hit" in the cache occurs when the information being addressed from main memory already exists in the cache A hit means that the information can be read from the cache and no read is performed to main memory. A "miss" occurs when the information being addressed from main memory is not in the cache. A read is performed to main memory to obtain the information, and a copy of the information is also stored in the cache.

The cache memory generally contains "lines" of information. Each line typically contains information from more than one memory address in main memory. Caches are created this way because it is commonly assumed that if information at one main memory address is used, information at addresses near the original address will also be used. Therefore, lines in the cache contain information from multiple main memory addresses.

Caches generally use some cache line replacement technique to lessen the likelihood that main memory will be accessed. A common cache line replacement technique is called a Least Recently Used (LRU) technique. The LRU cache line replacement technique attempts to determine which line in a cache is the least recently used and to replace the least recently used information with information being read from main memory. The directory typically contains data which is used to determine which lines in the cache are the least recently used.

Although LRU cache line replacement techniques are beneficial in older to update lines in a cache, a need still exists for additional cache line replacement techniques.

SUMMARY OF THE INVENTION

The present invention provides techniques for cache line replacement that selectively allow Least Frequently Used (LFU) or Most Frequently Used (MFU) cache line replacement. Additionally, a cache having MFU cache line replacement techniques is disclosed.

In an exemplary aspect of the invention, methods and apparatus allowing a choice of LFU or MFU cache line replacement are disclosed. The methods and apparatus determine new state information for at least two given cache lines of a number of cache lines in a cache, the new state information based at least in part on prior state information for the at least two given cache lines. Additionally, when an access miss occurs in one of the at least two given lines, the methods and apparatus (1) select either LFU or MFU replacement criteria, and (2) replace one of the at least two given cache lines based on the new state information and the selected replacement criteria.

In another exemplary aspect of the invention, a cache for replacing MFU cache lines is disclosed. The cache comprises a number of cache lines and state information for at least two given cache lines. The cache additionally comprises MFU circuitry (1) adapted to produce new state information for the at least two given cache lines in response to an access to one of the at least two given cache lines, and (2) when a cache miss occurs in one of the at least two given cache lines, adapted to determine, based on the new state information, which of the at least two given cache lines is the most frequently used cache line. The cache also comprises replacement circuitry coupled to the MFU circuitry and to the number of cache lines, the replacement circuitry adapted to replace the given cache line determined as the most frequently used.

A more complete understanding of the present invention, as well as further features and advantages of the present invention, will be obtained by reference to the following detailed description and drawings.

DETAILED DESCRIPTION OF PREFERRED EMBODIMENTS

The present invention provides techniques for cache line replacement allowing choice of LFU or MFU cache line replacement. In an exemplary embodiment, an LFU cache line replacement or MFU cache line replacement may be performed depending on a selection that can be predetermined or determined during real time. Methods and apparatus are disclosed herein that allow choice of LFU or MFU cache line replacement.

For ease of reference, the present detailed description is divided into an Introduction section and an Exemplary Embodiments section.

INTRODUCTION

This section presents reasons why choice of LFU or MFU cache line replacement might be beneficial for an embedded system. Although embedded systems are used as the examples herein, the present invention is in no way limited to embedded systems and may be applied to any system using a cache line replacement technique.

An embedded system is, for example, a computer system that contains one or more processors that each perform a specialized function or set of functions. Embedded systems may be contained within a more general computer system, e.g., a Digital Signal Processor (DSP) contained in a cell phone, a controller contained in a set-top box, or a graphics accelerator card contained in a general purpose computer system. The "code space" for an embedded system is the space used to store executable statements (e.g., called "code"). On an embedded system, the code space also typically contains data.

Typical embedded systems (e.g., DSPs and controllers) do not use cache memories for several reasons: the code space is often small enough that a small to medium sized, one level memory can contain it; the processors work in real-time and may not be able to tolerate any unexpected delays, which can be introduced by a cache miss; and power is often a major issue, so no components can be added that might consume additional power. Such embedded systems are typically a System on One Chip (SOC) and as such, the associated memory is generally a "macro" that fits on the same chip. This limits the code space to that of a fast Static Random Access Memory (SRAM), in the range of 64 KiloBytes (KBytes) or less, more often 16 KBytes.

As systems and applications increase in size, the code space increases and is already extending into regions where 16 to 64 KBytes is not sufficient Adding additional one-level memory macros on other chips can incur undesirable delays and thus makes caches, such as a first-level (L1) cache, attractive. As is known in the art, an L1 cache is typically formed on the same chip as the processor, while second-level (L2) or third-level (L3) caches are typically formed outside the package containing the chip and its processor. Thus the use of a cache for embedded systems is becoming more attractive, and eventually might be necessary. As described below, embedded processors have particular code execution characteristics which allow and in fact would make good use of a cache, such as an L1 cache.

As described above, in cache systems in common use, cache lines are generally replaced based on an LRU algorithm. Also, typical cache systems will be divided into a number of "congruence classes," each of which has a number of cache lines. Congruence classes are a way of organizing a cache.

There are two different nomenclatures used with respect to cache architecture. The one used herein is as follows. The "congruence class" determines a degree of set-associativity, which is the number of cache lines that simultaneously require a compare for deter mining a hit. Thus, a four-way set associative cache has four lines per congruence class and requires four compares on a virtual address to determine if a line is present in the cache. Each such congruence class contains four sets, A B, C, and D. So the total cache has a number of lines equal to A+B+C+D.

In more recent nomenclature, a "set" is the same as the congruence class defined above. Additionally, the sets defined above are called "ways" in the more recent nomenclature.

Each congruence class requires a small register to keep track of the ordering of the cache lines in each congruence class. For a four-way set associative cache, using a Least Recently Used (LRU) replacement technique, each congruence class of foul cache lines requires six stored bits to maintain the LRU order. An introduction to congruence classes and set associativity is described in Matick, "Computer Storage Systems and Technology," J. Wiley, 595-599 (1977), the disclosure of which is hereby incorporated by reference. LRU replacement algorithms are usually inadequate for the types of code encountered in embedded systems Techniques based on frequency of use are more desirable, as will be discussed below. Thus, LFU or MFU cache line replacement strategies are mole desirable, but were previously considered to be more difficult and expensive to implement.

In the past, an LFU type Of cache line replacement technique has been used in large storage systems for databases. Such techniques keep track of the frequency of use of disk pages and replace those which are least frequently used. These technique are more complex than that disclosed herein, require and use large, stored "tables of frequencies" that are updated and processed by a special stored program, and require typically microseconds to milliseconds to process. See, for example, N. Megiddo and DOS Modha, "ARC: A self-tuning, low overhead replacement cache," Proc of FAST'03: 2nd USENIX Conf. on File and Storage Techniques, 115-130 (2003), the disclosure of which is hereby incorporated by reference. Such algorithms and implementations are generally unsuitable for an L1 cache, or even L2 or L3 caches. However, the present invention provides LFU or MFU cache line replacement techniques that are suitable for a variety of levels of cache.

Figure 1:
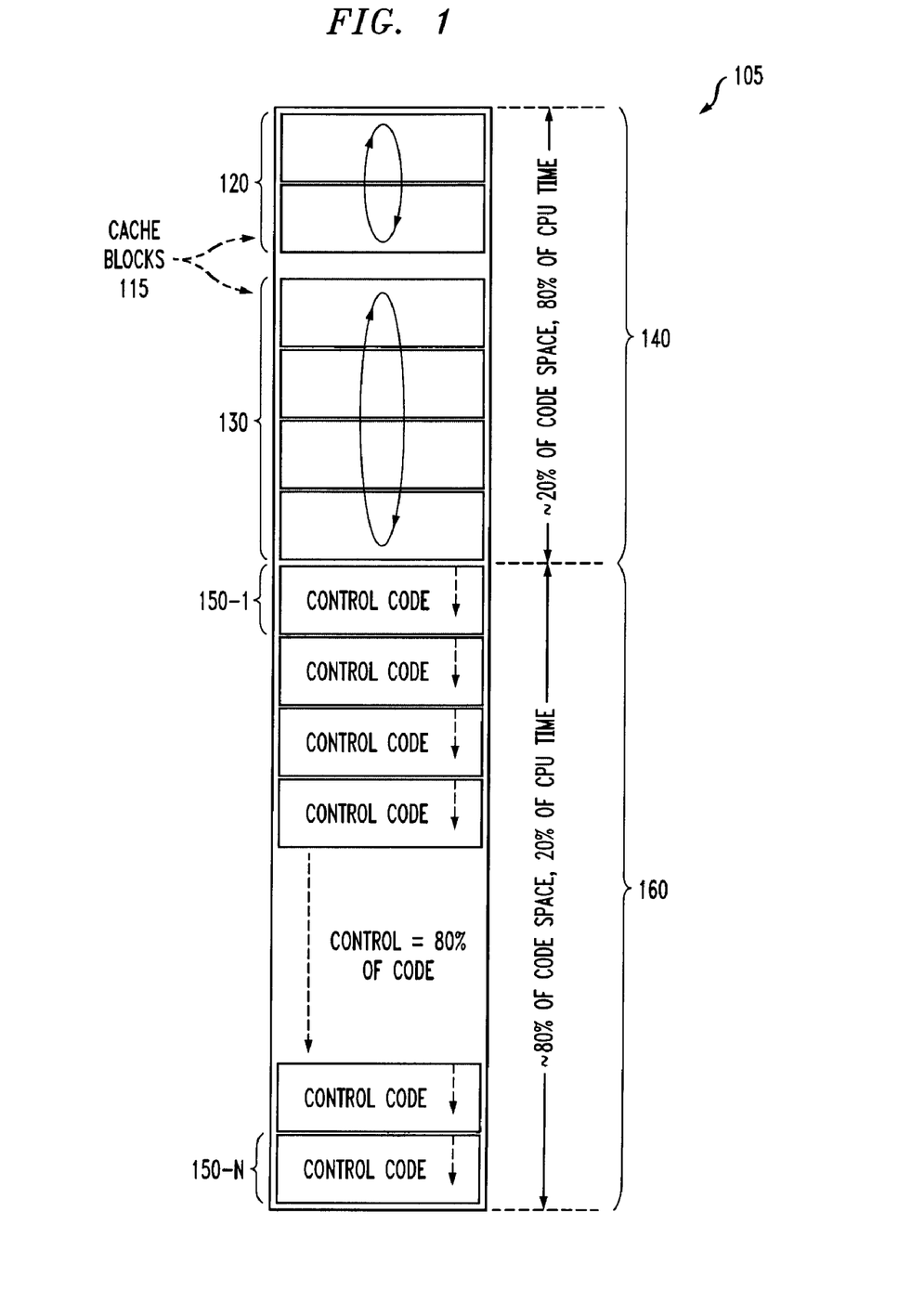
FIG. 1 is a block diagram showing three types of executable code used in a typical embedded system.

FIG. 1 shows an example of a cache 105 that has a number cache blocks 115. The caches blocks are broadly divided into two sections: a kernel section 140 and a control code section 160. Two cache blocks 115 are frontend kernels 120. Foul cache blocks 115 are backend kernels 130. The kernel section 140 is therefore divided into the frontend kernels 120 and backend kernels 130. A number of additional cache blocks 115 are control code blocks 150-1 through 150-N (collectively, "control code 150"). The control code section 160 is therefore divided into N control code blocks 150-1 through 150-N The different types of information in the cache blocks 115 will be examined to see why it can be beneficial to choose between LFU and MFU cache line replacement techniques depending on the type of code being executed.

Typically, code in an embedded system such as a DSP comprises three types of frames:

1. Control code 150 having short, typically sequentially executed instructions that seldom have much immediate reuse (e.g., no looping) but are re-executed on a long time scale. This control code 150 is invoked to start and control the kernel segments which do the real signal processing. Control code takes 20 percent of CPU time, but 80 percent of program code address space. If a cache line has only four Long Instruction Words (LIWs) and control lines only get sequential access, on average, then this would be a frequency of use-count of three or four accesses per line.

2. Frontend kernels 120 that will typically process 64 samples at a time. Frontend kernels 120 might be, for example, equalizers, digital filters, interpolators, decimators, and echo cancellers. Assuming all LIWs of a cache line get used, then 64 samples require 64 loops through the code. If cache lines are four LIW long (e.g., where one LIW is eight bytes) then each cache line will get used (e.g., accessed) 4*64=256 times.

3. Backend kernels 130 that will typically process 512 samples at a time, requiring 512 loops through the code Backend kernels 130 could be, e.g., Fast Fourier Transforms (FFTs), Reed Solomon decoders, Quadrature Amplitude Modulation (QAM) decoders and Viterbi decoders Again assuming each LIW gets used, then a cache line of four LIWs will be accessed 4*512=2048 times.

A typical application might have the following code stored in the cache: 16 frontend kernels 120 (at eight LIWs or 64 bytes per kernel) and one backend kernel 130 of 128 LIW or 1 Kbytes. At 32 bytes per cache line, this represents 16 frontend kernels 120 occupying two cache lines per kernel, and one backend kernel 130 occupying 32 cache lines plus about 8 Kbytes or more of control and Operating System (OS) code.

This code, stored as lines in a cache might look and behave as shown in FIG. 1. The control code section 160 takes up 80 percent of the memory space, but since it is used mainly sequentially with no looping, it takes only about 20 percent of the processing time. The control code 150 is reused but only on a long time scale. However, having it resident when needed can be important for performance in order to get kernels started quickly.

The kernel section 140, which occupies about 20 percent of the memory space, will typically take 80 percent of the processing time. Typically, this code stored in a cache 105 would only have one backend kernel 130, which would be executed to completion, and would not be used again for a long time and thus should be replaced in the cache by another backend kernel 130. Frontend kernels 120 are generally much smaller, so many can reside in the cache 105 at one time. Since part of or even the entire group of frontend kernels 120, are likely to be reused sometime relatively soon, they should be maintained in the cache.

Depending on the application, the backend kernels 130 should be replaced whenever a cache miss occurs, and sometimes the control code 150. The feature of such DSP, or any similar code which allows this is as follows.

A typical application scenario would be something as follows

Assume code in the frontend kernel 120 is executing: all four LIWs of all 32 lines are used and the code loops though all these 64 times (e.g., for 64 samples). So each cache line is accessed 4 LIW*64 loops=256 times. If the processor executes, on average, one LIW each cycle, this full frontend kernel 120 takes 4*32*64=8K cycles. At five nanoseconds (ns) per cycle, this is 40 microseconds (its) of processor time.

In between each frontend kernel 120, some control code 150 is executed to set up the next frontend kernel 120. This is typically all sequential, with little or no looping, so each control code 150 cache line is used four times maximum. When the frontend kernel 120 is done executing, the control code 150 sets up the backend kernel 130.

Code in the backend kernel 130 executes all four LIWs of all 32 cache lines but redoes this entire process 512 times (maybe not in order, but on average covers all LIWs this way). So each cache line of the backend kernel 130 is accessed 4*512=2K times. The entire single backend kernel 130 of 32 lines requites a total of 4*32*512=64K cycles or 320 μs at five ns per LIW.

So the frequencies between "fast" (e g, 40 μs) frontend kernels 120 and "slow" (320 μs) backend kernels 130 is 256 versus 2K, a factor of eight as per the length of samples making up the loops in each of the types of kernels.

Thus the frequencies of use for a 32 byte, four LIWs cache lines are typically the following:

Control code 150~4 accesses/cache line (1)
Frontend (e.g., "fast") kernels 120~256 accesses/line (2)
Backend (e.g., "slow") kernels 130~2048 accesses/line (3)

When the first backend kernel 130 is completed, one or several other different, large backend kernels 130 will typically be executed before this first backend kernel 130 will be needed again. However, in the meantime, the same 16 small frontend kernels 120 will likely be repeatedly reused, possibly even multiple times while the first backend kernel 130 is running.

Various replacement policies are possible, and the choice depends on the particular application with its details of behavior. For the above scenario of a cache 105 with 16 small, fast, frontend kernels 120 and one large, slow backend kernel 130, the set of 16 frontend kernels 120 can be invoked multiple times while the backend kernel 130 is running, and this set of frontend kernels 120 and backend kernels 130 is reused many times. Thus, for this case, it is desirable to maintain the set of 16 frontend kernels in the cache and replace the backend kernel 130 while keeping any already present frontend kernels 120 and control code 130. For the implementation to be described below, the backend kernels 130 can be made to be the MFU cache lines, with some small exceptions. Thus this case would use a MFU cache line replacement technique.

In other applications, or under different conditions, the control code 150 needed at any time can change significantly even while the same backend kernel 130 is executing. In such cases, it would be desirable to replace the control code 150 while keeping any already present frontend kernels 120 and backend kernels 130. For the implementation to be described below, the control code 150 can be made to be the LFU cache lines, with possibly some small exceptions. Thus this case would use a LFU cache line replacement techniques.

Either of these cache line replacement policies is possible within the realm of exemplary embodiments herein. In one embodiment, choice of either LFU or MFU cache line replacement is achieved by keeping a limited frequency count of each cache line usage, and a separate count of the total usage of each congruence class within a cache directory, for a set associative cache organization, where the set associativity can be any value.

EXEMPLARY EMBODIMENTS

This section describes exemplary implementations for achieving a dynamic, partitioned cache having selectable LFU or MFU cache line replacement techniques.

Figure 2:
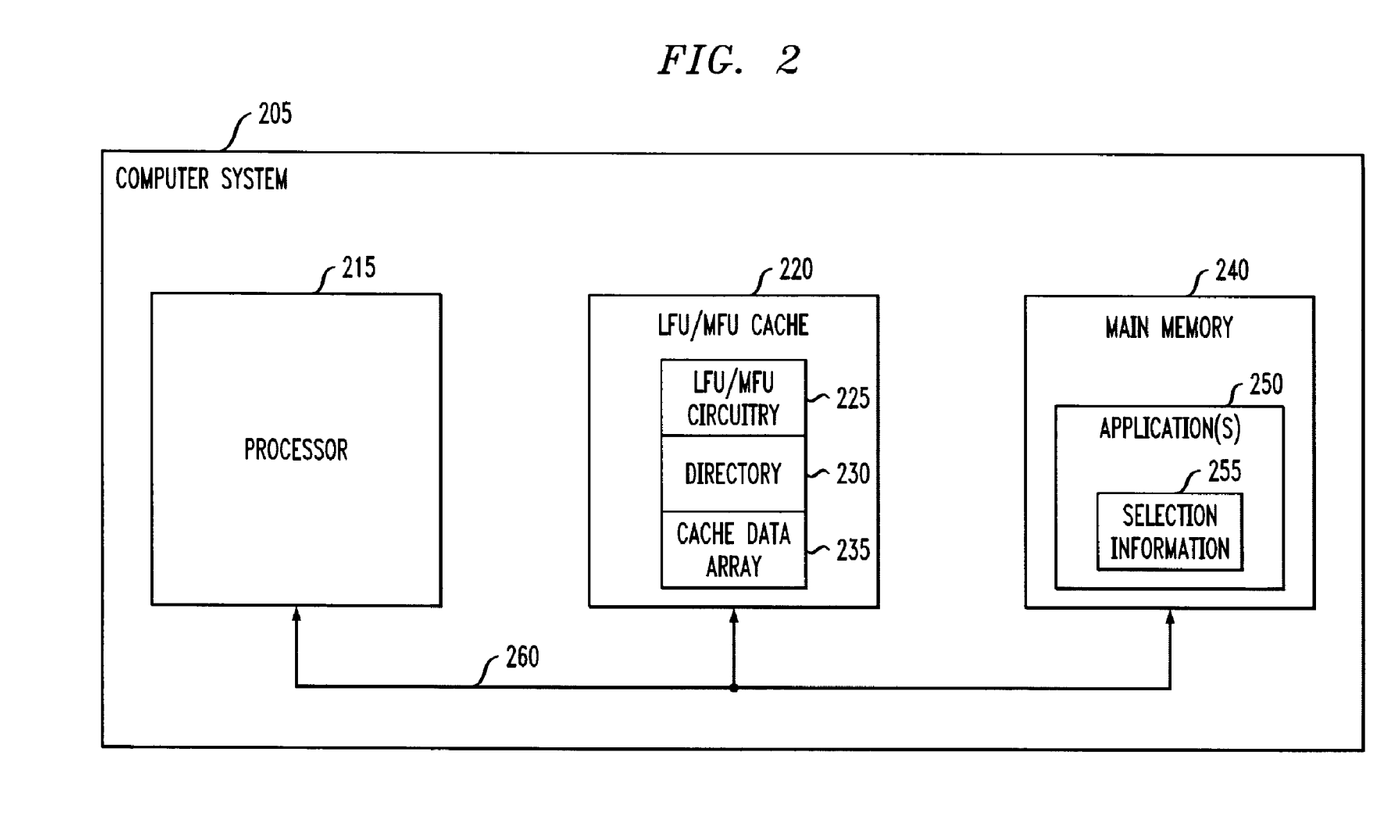
FIG. 2 is a block diagram of a computer system providing techniques for cache line replacement allowing choice of LFU or MFU cache line replacement, in accordance with an exemplary embodiment of the present invention.

Turning now to FIG. 2, a computer system 205 is shown. Computer system 205 comprises a processor 215, an LFU/MFU cache 220, and a main memory 240, each of which is interconnected through bus 260. LFU/MFU cache 220 comprises LFU/MFU circuitry 225, directory 230, and cache data array 235. Main memory 240 comprises one or more applications 250, which comprise selection information 255.

LFU/MFU circuitry 225 is used to perform the LFU or MFU cache line replacement technique. The LFU/MFU circuitry 225, as described below, has selection circuitry that can take input from, fox instance, main memory 240 in order to determine which of the LFU or MFU cache line replacement techniques should be used for kernels or executable statements in main memory 240. Directory 230 has information (not shown) such as addresses for cache lines in cache data array 235 and certain counters (described, e.g., in reference to FIG. 3 below) used during LFU and MFU calculations Cache data array 235 contains cache lines (not shown).

The application 250 is an application executed by the processor 215. The selection information 255 is information that marks a portion (not shown) of application 250 or even single executable statements (not shown) in application 250 to indicate which of the LFU or MFU cache line replacement technique should be used. The application 250 may also be an OS. The portion of application 250 could be, for example, a frontend kernel, backend kernel, or control code, as described above. Additionally, the application 250 may be multiple applications 250, where each application is typically assigned either an LFU or MFU cache line replacement technique. Furthermore, selection information 255 may be stored outside of application 250 or could be an instruction that places LFU/MFU circuitry 225 in either an LFU cache line replacement technique or an MFU cache line replacement technique.

In a simple system, a user, through techniques such as selection of an input parameter or choice of a particular operating system, at time of starting the system (called Initial Program Load, or IPL), would specify which cache line replacement technique to use. Then the cache line replacement technique is fixed until changed as above.

In a more complex system, the compiler would determine the best cache line replacement technique and set one or more parameters, which the system OS reads to set the proper cache line replacement technique. This could be done separately for each separate application run on the system.

An even more complex system could dynamically keep a running score of the effectiveness of the "current" cache line replacement technique setting and change the setter during real-time if performance sags. This is rather complex and requires some way to measure performance, but the present invention would allow the complex system to change cache line replacement techniques during operation.

Figure 3:
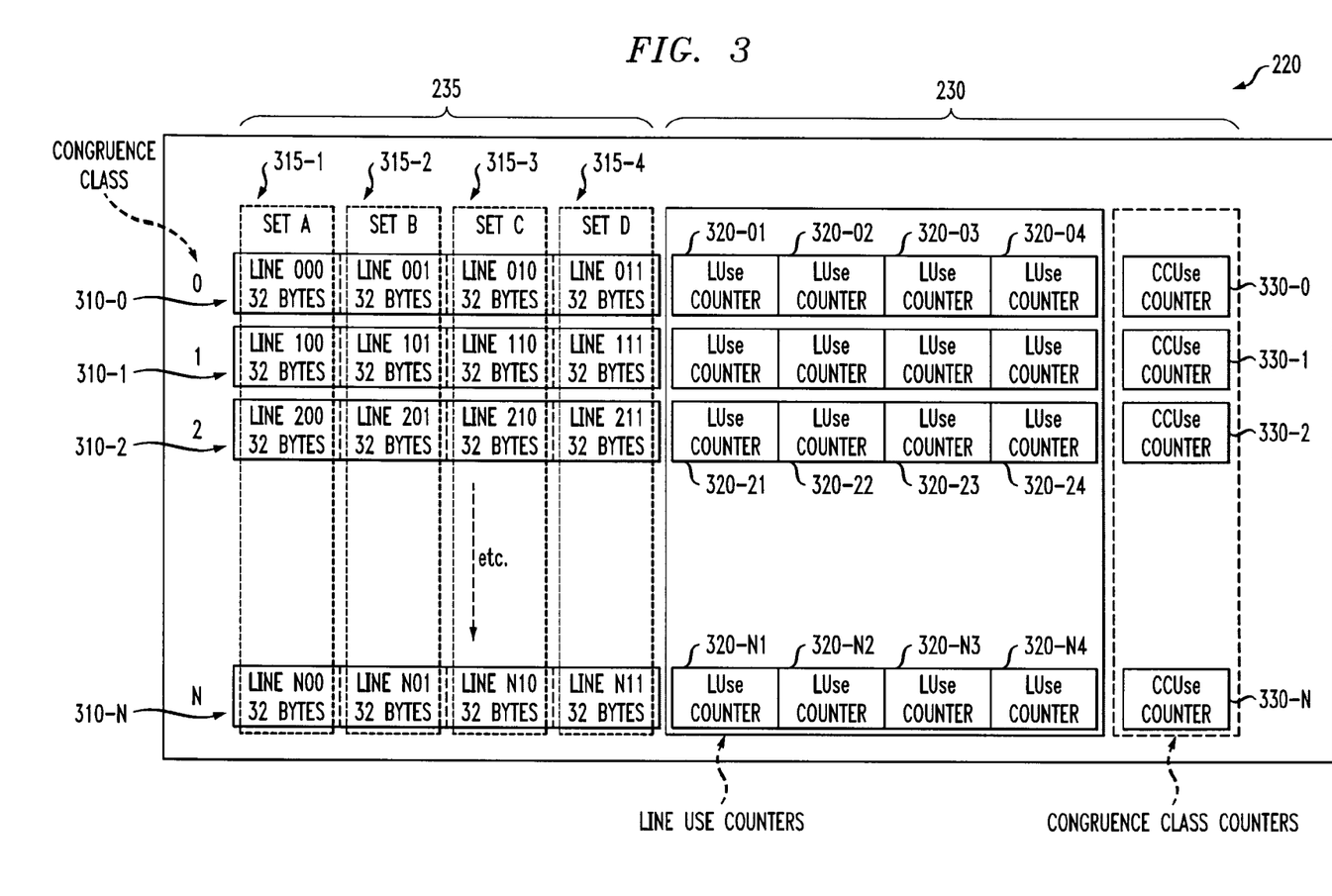
FIG. 3 is a block diagram of a cache operating in accordance with an exemplary embodiment of the present invention.

Referring now to FIG. 3, an LFU/MFU cache 220 is shown. In this example, the LFU/MFU cache 220 is a four-way set-associative cache, with sets A through D. Cache data array 235 comprises N+1 congruence classes 310-0 through 310-N. Each congruence class 310 comprises four sets 315-1 through 315-4, each set of each congruence class 310 being a cache line. In FIG. 3, "Line XYY" refers to congruence class X and Set YY, where YY is written in binary. It should be noted that the term "cache line" indicates any portion of a cache that may be replaced. For example, cache lines may be called "blocks" in certain cache implementations. Directory 230 comprises a one line use (LUse) counter 320 for each line in cache data array 235. Consequently, there are 4*(N+1) LUse counters 320. Directory 230 also comprises one congruence class use (CCUse) counter 330 for each of the congruence classes 310.

The LFU/MFU cache 220 replaces cache lines which are either least frequently used or most frequently used based on, for example, the criteria described below.

The LUse counters 320 keep count of the number of times a cache line has been used within some arbitrary period (to be discussed later) by including, for example, 4 to 7 bits (allowing counts of 16 to 128) corresponding to each cache line. This adds 4× Number of Cache Lines or 7× Number of Cache Line bits to the directory, which is not very large for most cases. For instance, for a 16 Kbyte cache, the extra bits for four bit counters amount to 512×4=2 K BITS for 32 byte cache lines or 4×256=1 K Bits for 64 byte cache lines. Additional bits for 7 bit counters in a 16K byte cache with 32 byte cache lines would be 7×512=3584, and 1'792 bits for 64 byte cache lines.

In addition, each congruence class 310 has, in this exemplary embodiment, one additional counter; the CCUse counter 330. This CCUse counter 330 will typically have one to three more bits than the LUse counters 320. If eight bits are used for each CCUse counter 330, then the directory 230 for a 16K, four-way set associative cache using 32 byte cache lines will requite an additional 8*512/4=1K bits, and only 512 additional bits for 64 byte cache lines.

Figure 4:
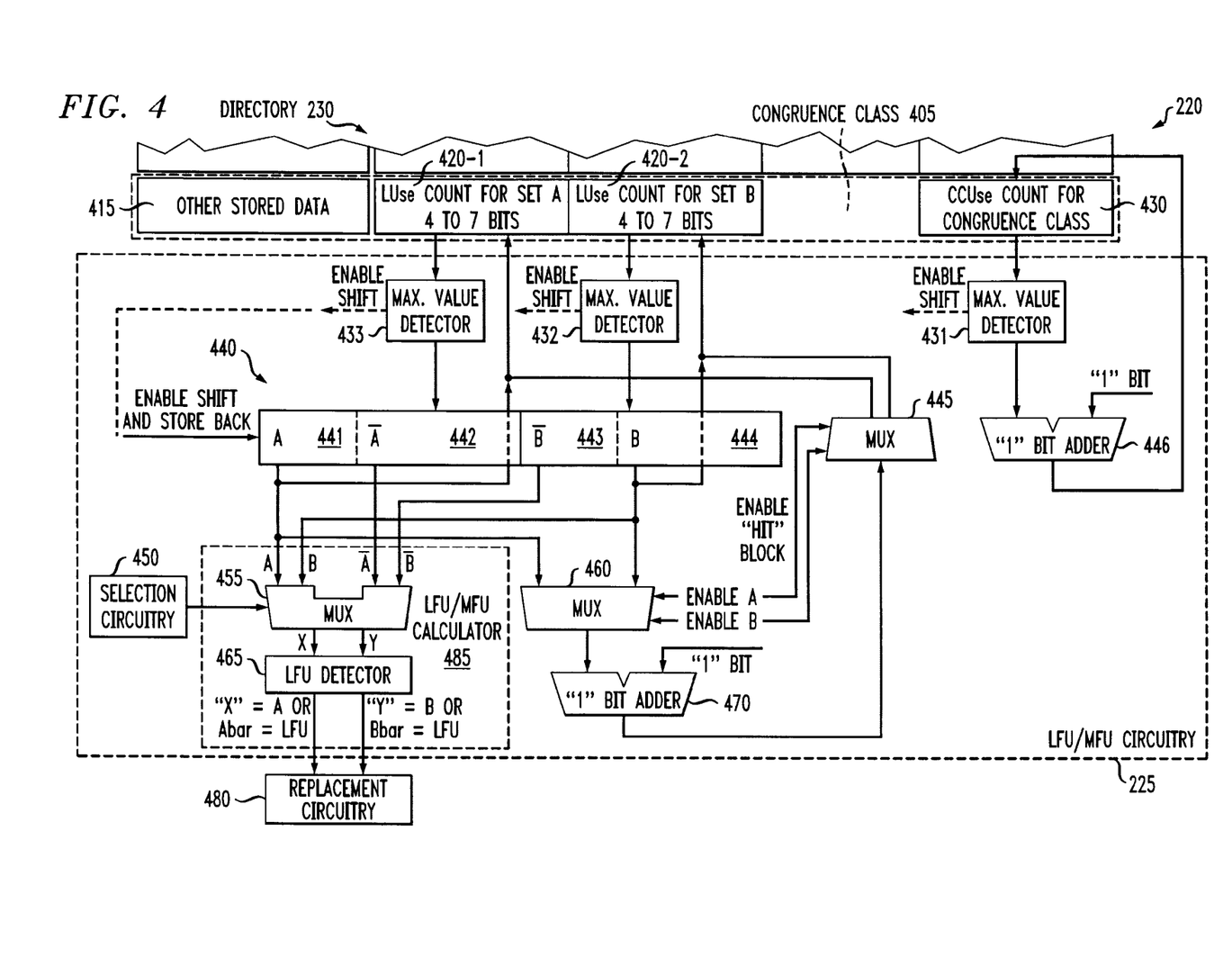
FIG. 4 is another block diagram of a cache operating in accordance with an exemplary embodiment of the present invention, and in particular illustrating LFU/MFU circuitry of the cache.

Turning now to FIG. 4, LFU/MFU cache 220 is shown in a different view. In this example, the LFU/MFU cache 220 is a two-way set-associative cache. The LFU/MFU cache 220 comprises, in this figure, the directory 230, the LFU/MFU circuitry 225, and replacement circuitry 480. The directory 230 comprises LUse counters 420-1, 420-2 and a CCUse count 430 for the congruence class 405 to which the cache lines (not shown), corresponding to the LUse counters 420, belong. The directory 230 also comprises other stored data 415 (such as addressing information corresponding to the cache lines, which correspond to the LUse counters 420). For simplicity, only one congruence class 405 is shown.

The LFU/MFU circuitry 225 comprises maximum (max.) value detectors 433, 432, and 431, a data register 440, multiplexers (MUXs) 455, 460, and 445, an LFU detector 465, selection circuitry 450, and one-bit adders 446 and 470. An LFU/MFU calculator is comprised of the MUX 455 and LFU detector 465. The LFU/MFU calculator 485 is an example of a device used to perform either a LFU calculation or an MFU calculation. The data register 440 comprises non-inverted versions 441, 444 of the LUse counters 420-1 and 420-2 and inverted versions 442, 443 of the LUse counters 420-1, 420-2. The data register 440 is adapted to invert the data from the LUse counters 420-1 and 420-2. The data register 440 is also adapted to shift the data from the LUse counters 420-1, 420-2, for reasons described below.

In the example of FIG. 4, exemplary LFU or MFU cache line replacement techniques make use of the LFU counters 420 in the following way. Each time a cache line experiences a hit access, the LUse counter 420 corresponding to that cache line has a one added to its value. This is performed via MUX 460, which is enabled via enables for Set A or Set B. The one-bit adder 470 increases the value of the LUse counter 420-1 or 420-2 corresponding to the cache line experiencing the hit. The resultant value then passes through the MUX 445 back to either LUse counter 420-1 or LUse counter 420-2. When the LUse counter 420 of any accessed congruence class 405 reaches its maximum value (e.g., a value of 15 for 4 bit counter; or a value of 127 for 7 bit counter), then all LUse counters 420 in this congruence class 405 awe divided in half (e.g., a light shift by one) to ensure the collect older of "use frequency" is maintained. In general, the division can be any integer division. The data register 440 is adapted to shift the data from LUse counters 420 when either Max value detector 433 or Max. value detector 432 enables the data register 440. The shifted data is then stored back to LUse counters 420-1, 420-2.

If a miss occurs, which requires replacing a cache line, the LUse counters 420 of the accessed congruence class 405 are searched for the entry with the smallest (LFU) or largest (MI U) count value.

In order to perform the LFU or MFU cache line replacement, the selection circuitry 450 selects which set of data from LUse counters 420 is to be used. The selected set of data will be A and B or $\overline{A}$ and $\overline{B}$. The selection circuitry 450 will enable the MUX 455 to select the set A and B when LFU cache line replacement is desired. Conversely, when MFU cache line replacement is desired, the selection circuitry 450 will enable the MUX 455 to select the set $\overline{A}$ and $\overline{B}$.

The LFU detector 465 performs a least frequently used calculation on one of the sets A and B or $\overline{A}$ and $\overline{B}$. When the LFU cache line replacement technique is selected, the LFU detector 465 performs the least frequently used calculation on the set A and B. The least frequently used calculation will select the LUse counter 420 with the smallest value. Thus, the output of the LFU detector 465 will be an indication as to which of the LUse counters 420 is the smallest, and the smallest LUse counter 420 corresponds to the least frequently used cache line. When the ME U cache line replacement technique is selected, the LFU detector 465 performs the least frequently used calculation on the set $\overline{A}$ and $\overline{B}$. The least frequently used calculation will select the largest LUse counter 420. Thus, the output of the LFU detector 465 will be an indication as to which of the LUse counters 420 is the largest, and the largest LUse counter 420 corresponds to the most frequently used cache line.

In order to ensure the eventual replacement of a cache line that reaches a high count value and is not accessed anymore while the other cache lines in the same congruence class 405 are all used a fewer number of times, the count value of all entries may be reset to one-half of their values at some predetermined period. This period may be determined as follows: each congruence class 405 increments and makes use of its own CCUse counter 430 as previously indicated. The CCUse counter 430 starts at zero and is incremented by one (via one-bit adder 446) each time a hit or miss occurs in its corresponding congruence class 405. When any CCUse counter 430 in a currently accessed congruence class 405 reaches some predetermined value (as determined, e.g., by Max. value detector 431), all LUse counters 420 in that congruence class 405 are divided in half and the CCUse counter 430 is reset to zero. As a result, any non-active cache lines, and thus non-changing LUse counters 420, which initially have a high count value will reduce to one in three such periods, and to zero in four such periods, assuming a foul bit counter A seven bit counter with a higher maximum value will reduce to one in six such periods and zero in seven such periods. The cache line will likely be replaced before this, assuming the other cache lines are active.

Replacement circuitry 480 replaces the cache line indicated by the LFU detector 465. Replacement circuitry 480 is well known in the art.

The LFU/MFU calculator 485 can also include inverters to create A and B, if desired. The LFU/MFU calculator 485 is one implementation for calculating, by using the LUse counters 420, which cache line is the least or most frequently used.

Selection circuitry 450 can be as simple as an input having a logic zero or logic one placed thereon. Selection circuitry 450 could be circuitry that determines, by using a bit or bits stored in an executable statement in the cache lines to which the LUse counters 420 correspond, whether a LFU or MFU cache line replacement technique should be used. As another example, the selection circuitry 450 could select a LFU or MFU cache line replacement technique based on address ranges corresponding to cache lines for the congruence class 405 or based on other criteria.

In a broad sense, the LFU/MFU circuitry 225 can perform a state-determination process. The "state" may be saved in the LUse counters 420 and in the CCUse counters 430. New state is the new counts stored in LUse counter 420 and CCUse counters 430, after incrementing by 1 or shifting (e.g., dividing in half) State-determination processing can be considered as two different processes: (1) State updating, which updates state via Max value detectors 433, 432, and 431, enable shift/storeback, two 1-bit addresses (446 & 470), MUX 460, MUX 445, plus some simple logic (not shown) such as "Enable Shift" logic; and (2) state detection on miss, which uses the LFU detector 465 plus selection circuitry 450 to select either LFU or MFU cache line replacement with MUX 455 and based on LFU or MFU cache line criteria (such as that provided by the selection information 255 of FIG. 2).

One reason for considering a state-determination process is the following. Suppose the cache is using an LFU replacement, and assume one congruence class is active, and has two cache lines (e.g., set associativity=2) Starting from a cold start (i.e., no previous cache line replacement), all use counters, both LUse set A counter 420-1, LUse set B counter 420-2, and CCUse counter 430 for this congruence class 405 are zero. Now suppose some cache access occurs to this congruence class 405. This will be a miss, one of the two cache lines (e.g., empty slots), say from set A, will get filled and its LUse counter 420-1 will be incremented by one. The LUse counter 420-2 of set B of the second cache line of this same congruence class is not processed (e.g., remains at 0). Now suppose another access occurs to this same congruence class and is a miss. The LFU line to be changed which is a cache line of set B, whose LUse counter 420-2 (e.g., state) has not been processed, i.e., has not been changed. In this case the state has not been updated for the LUse counter 420-2, but a state-determination process can still modify the LFU cache line.

It should be noted that LFU/MFU circuitry 225 can be modified to solely perform either LFU cache line replacement or MFU cache line replacement. For instance, always providing inverted versions of LUse counters 420 to the MUX 455 will select MFU cache line replacement. Similarly, always providing non-inverted versions of LUse counters 420 to the MUX 455 will select LFU cache line replacement.

Figure 5:
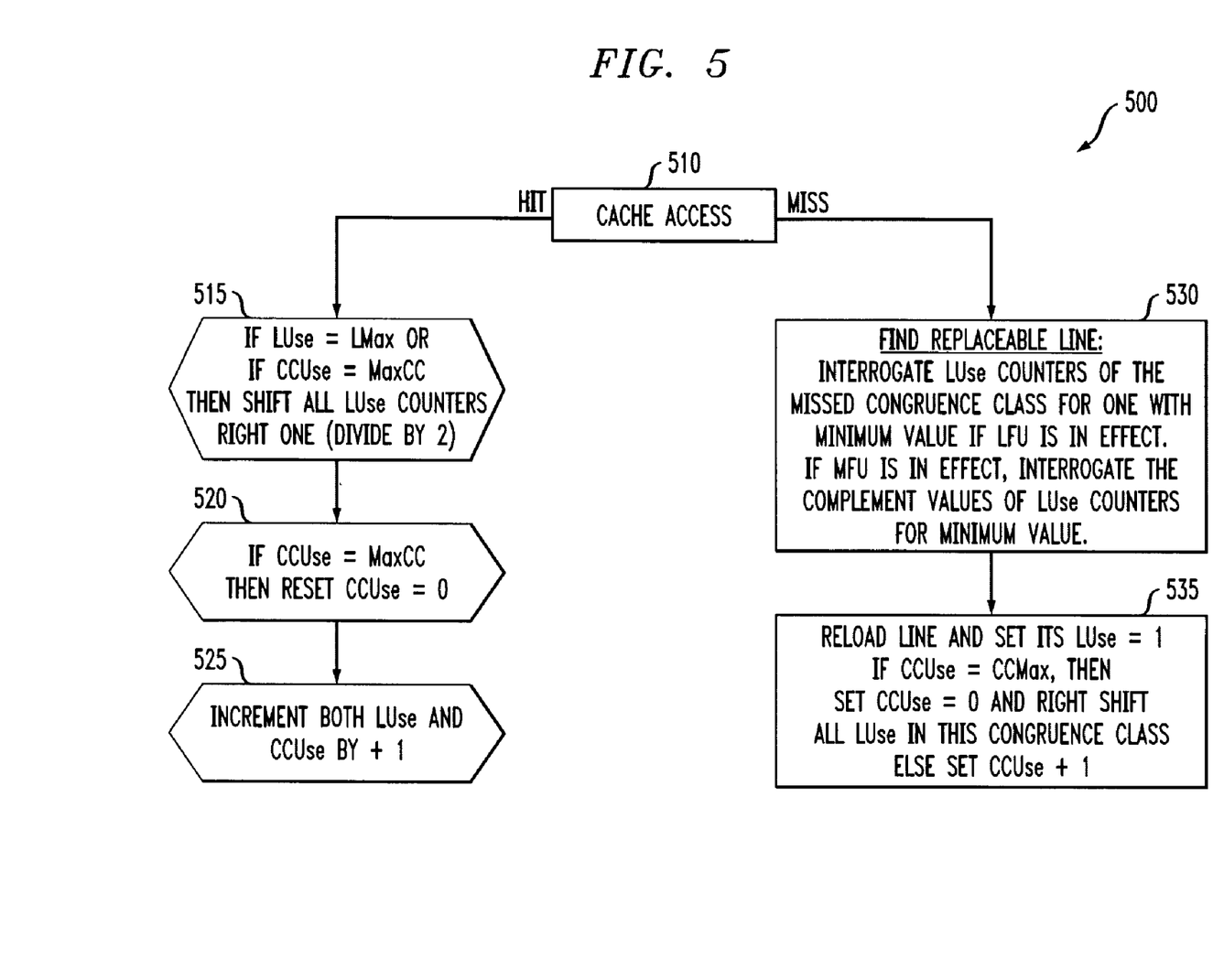
FIG. 5 is a method for cache line replacement allowing choice of LFU or MFU cache line replacement, in accordance with an exemplary embodiment of the present invention.

Turning now to FIG. 5, a method 500 is shown that allows choice of LFU or MFU cache line replacement. Method 500 is generally performed by LFU/MFU circuitry 225 of the LFU/MFU cache 220. In step 520, a cache access occurs. If a hit occurs, steps 515, 520 and 525 are performed. If a miss occurs, steps 530 and 535 are performed.

In step 515, if LUse=LMax (e.g., the maximum value for an LUse counter) or if CCUse=MaxCC (e.g., the maximum value for a CCUse counter), then shift all LUse counters right one (e.g., divide by two). In step 520, if CCUse=MaxCC, then reset CCUse to zero. In step 525, both LUse and CCUse are incremented by one.

In step 530, a replaceable cache line is found. The LUse counters of the missed congruence class are compared in order to determine the LUuse counter with minimum value if LFU cache line replacement is in effect. If MFU cache line replacement is in effect, the complemented values of the LUse counters are compared in order to determine the minimum value. In step 535, the cache line that is the least or most frequently used for the congruence class is reloaded and the LUse counter for the replaced cache line is set to one. If CCUse=CCMax, then set CCUse to zero and right shift all LUse counters in this congruence class. Otherwise, increment CCUse.

It should be noted that different locations in method 500 could result in CCUse with the maximum value. Pot example, CCUse could be a maximum value before step 515 or after step 535. Testing could be performed, if desired, at these points to ensure that CCUse does not exceed its maximum value without a corresponding reset.

Figure 6:
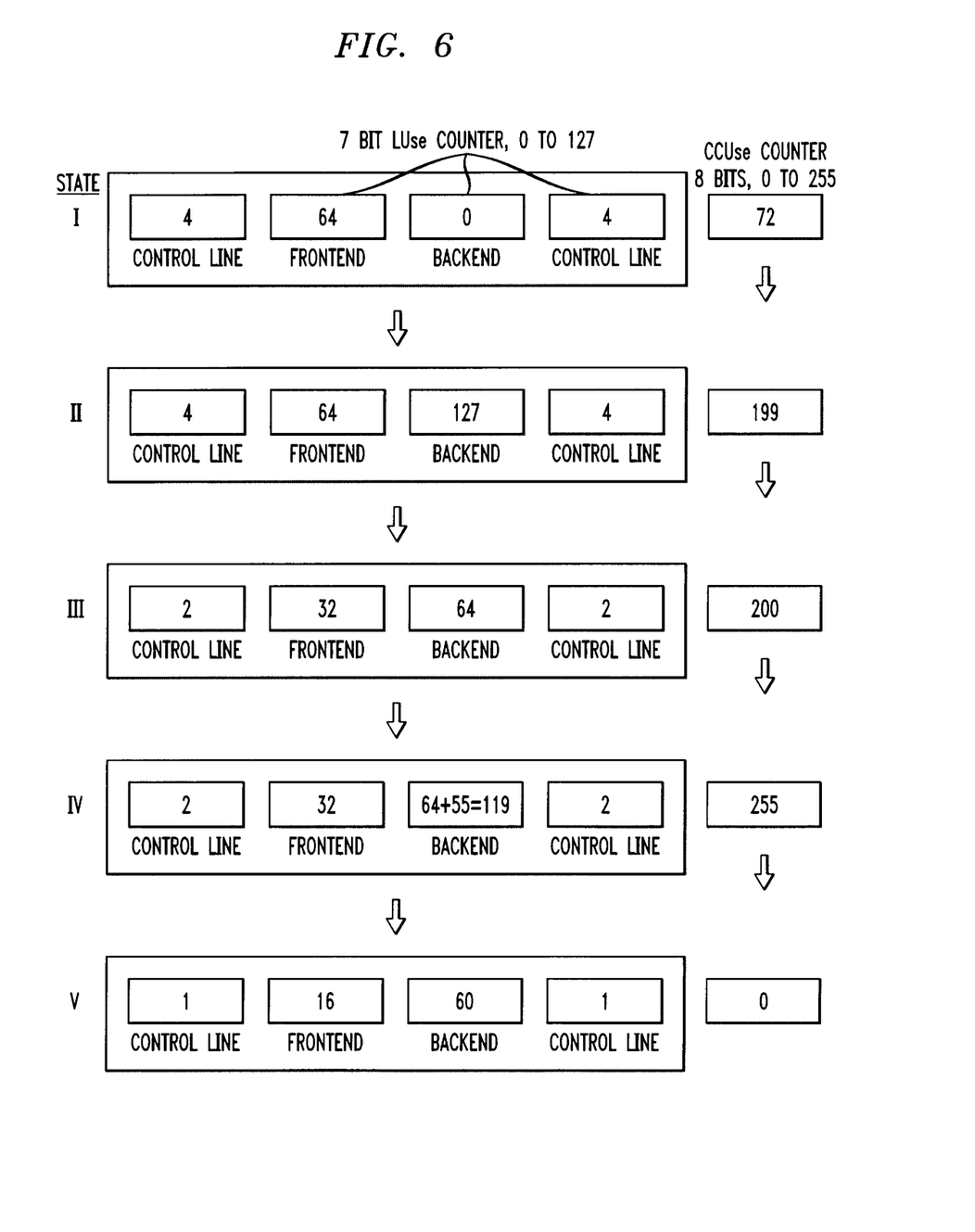
FIG. 6 is a block diagram of an exemplary use of counters to implement an exemplary embodiment of the present invention.

The examples shown in FIG. 6 illustrate the use of the LUse and CCUse counters. A typical scenario of cache usage and filling or resetting of the LUse and CCUse counters might be as follows Assume the LUse counters are all 7 bits (e.g., counting from zero to 127) and the CCUse counter is 8 bits.

It is assumed that the cache line use counters were all initially zero, then some control code and frontend code is executed to complete one full set of 16 frontend kernels. The final state of all counters of one congruence class is shown as State I.

Next, a backend kernel begins processing and completes 128 samples (e.g., loops) resulting in a state of all counters that is shown as State II. The same backend kernel processes one more sample (e.g., loop), causing its LUse counter to reach 127+1, which exceeds the maximum count value and causes all LUse counters to be divided in half. The new state is State III.

Backend kernel continues processing 55 more loops, resulting in a state as shown in State IV. In this state, the CCUse counter is at its maximum value.

Backend kernel processes another loop, causing the CCUse counter to exceed its maximum value, thereby causing all LUse counters to be divided in half and resetting the CCUse counter itself to zero. This results in the new state shown as State V.

Examination of the four LUse counters shows that, with the exception of State I, the backend code lines are the MFU for all other cases. Thus, if the architecture or application dictates replacement of backend lines, the hardware only has to select the complements of the LUse counters to the LFU detector. By use of the complements, the counter values are effectively reversed so the MFU count becomes the LFU value. On rare occasions (e.g., if a miss occurs to the congruence which happens to be in state State I), the wrong line will be replaced. This will occur infrequently and only constitutes a minor degradation in performance, if any at all (this could, in fact, be the correct line to replace due to circumstances).

If the application or architecture specifies the replacement of control code, then the hardware only has to select the "true" values of the LUse counters to the LFU detector. Thus, the system only needs one LFU detector and can perform either MFU or LFU replacement. In fact, the choice can be made dynamically, since the only delay is a selection via a MUX in an exemplary embodiment shown above. Thus, if a compiler or other means (e.g., such as the programmer) can specify which choice is more desirable for any given application, the replacement policy is easily adjusted to suit this choice, and can be varied from application to application, or even from cycle to cycle.

The additional circuits required for the techniques of the present invention have been sized for one technology and implementation, and are relatively quite small in area and power consumption. Thus, the use of an off-chip main memory feeding a small cache on-chip with a processor, rather than an on-chip larger non-cached memory, can significantly reduce overall chip-power while maintaining performance. Exemplary embodiments of the present invention also allow fine tuning of the replacement policy to the application, either statically, at initial program load, or dynamically, while executing.

It is to be understood that the embodiments and variations shown and described herein are merely illustrative of the principles of this invention and that various modifications may be implemented by those skilled in the art without departing from the scope and spirit of the invention.

What is claimed is:

1. A method allowing a choice of Least Frequently Used (LFU) or Most Frequently Used (MFU) cache line replacement, the method comprising the steps of:
    determining new state information for at least two given cache lines of a plurality of cache lines in a cache, the new state information based at least in part on prior state information for the at least two given cache lines; and
    when an access miss occurs in one of the at least two given lines:
    selecting either LFU or MFU replacement criteria wherein said selection is based on a selection signal that indicates a type of replacement criteria, wherein said selection signal is capable of distinctly identifying said MFU and LFU types of replacement criteria; and
    replacing one of the at least two given cache lines based on the new state information and the selected replacement criteria.

2. The method of claim 1, wherein:
    the state information comprises a plurality of line use counters, each line use counter corresponding to one of the plurality of cache lines; and
    the step of determining new state information further comprises the step of incrementing a given line use counter when a cache line corresponding to the given line use counter is referenced.

3. The method of claim 2, where the reference to the cache line corresponding to the given line use counter is a hit reference.

4. The method of claim 2, wherein:
    the plurality of cache lines are assigned to a plurality of congruence classes, each congruence class assigned to at least two of the plurality of cache lines, whereby at least two of the line use counters corresponds to a congruence class;
    the state information further comprises a plurality of congruence class use counters; and
    the step of determining new state information further comprises the step of incrementing a given one of the plurality of congruence class use counters when a congruence class corresponding to the given congruence class use counter is referenced, wherein each of the plurality of congruence class use counters corresponds to one of the congruence classes.

5. The method of claim 4, wherein the reference to the congruence class corresponding to the given congruence class use counter is a hit reference.

6. The method of claim 4, wherein:
    a given congruence class corresponds to a given congruence class use counter; and
    the step of determining new state information further comprises the steps of, when the given congruence class use counter exceeds a maximum congruence class use counter limit:
    dividing all of the line use counters corresponding to the given congruence class by an integer; and
    resetting the given congruence class use counter.

7. The method of claim 6, where the integer is a power of 2.

8. The method of claim 4, wherein the cache is an n-way set associative cache, whereby there are n cache lines per congruence class.

9. A cache allowing a choice of Least Frequently Used (LFU) or Most Frequently Used (MFU) cache line replacement, the cache comprising:

a plurality of cache lines;
state information for at least two given cache lines of the plurality of cache lines;
LFU/MFU circuitry adapted:
to determine new state information for at least two given cache lines of a plurality of cache lines in a cache, the new state information based at least in part on prior state information for the at least two given cache lines;
when a cache miss occurs in one of the at least two given lines:
to select either LFU or MFU replacement criteria, wherein said selection is based on a selection signal that indicates a type of replacement criteria, wherein said selection signal is capable of distinctly identifying said MFU and LFU types of replacement criteria; and
to determine which one of the at least two given cache lines should be replaced based on the new state information and the selected replacement criteria; and
replacement circuitry coupled to the LFU/MFU circuitry and to the plurality of cache lines, the replacement circuitry adapted to replace the selected given cache line based on the selected replacement criteria.

10. The cache of claim 9, wherein:
the state information comprises a plurality of line use counters, each line use counter corresponding to one of the cache lines; and
the LFU/MFU circuitry is further adapted to increment a given line use counter when a cache line corresponding to the given line use counter is referenced.

11. The cache of claim 10, where the reference to the cache line corresponding to the given line use counter is a hit reference.

12. The cache of claim 10, wherein the plurality of cache lines are assigned to a plurality of congruence classes, each congruence class assigned to at least two of the plurality of cache lines, whereby at least two of the line use counters corresponds to a congruence class, the state information further comprising a plurality of congruence class use counters, each of the congruence class use counters corresponding to one of the congruence classes, and wherein the LFU/MFU circuitry is further adapted to increment a given congruence class use counter when a congruence class corresponding to the given congruence class use counter is referenced.

13. The cache of claim 12, wherein the reference to the congruence class corresponding to the given congruence class use counter is a hit reference.

14. The cache of claim 12, wherein a given congruence class corresponds to a given congruence class use counter, and wherein the LFU/MFU circuitry is further adapted, when the given congruence class use counter exceeds a maximum congruence class use counter limit, to divide all of the line use counters corresponding to the given congruence class by an integer and to reset the given congruence class use counter.

15. The cache of claim 14, where the integer is a power of 2.

16. The cache of claim 12, wherein the cache is an n-way set associative cache, whereby there are n cache lines per congruence class.

17. A cache for replacing Most Frequently Used (MFU) cache lines, the cache comprising:
a plurality of cache lines;
state information for at least two given cache lines of the plurality of cache lines, wherein said state information includes at least one relative MFU count;
MFU circuitry adapted:
to produce new state information for the at least two given cache lines in response to an access to one of the at least two given cache lines and to maintain said at least one relative MFU count to indicate a frequency of use of at least one of said given cache lines based on a frequency of use of one or more other of said given cache lines; and
when a cache miss occurs in one of the at least two given cache lines to determine, based on the new state information, which of the at least two given cache lines is the most frequently used cache line; and
replacement circuitry coupled to the MFU circuitry and to the plurality of cache lines, the replacement circuitry adapted to replace the given cache line determined as the most frequently used.

18. The cache of claim 17 wherein said MFU circuitry is further adapted to adjust said at least one relative MFU count when said at least one relative MFU count exceeds a maximum threshold.

* * * * *